Sept. 10, 1957   J. L. EMERY ET AL   2,806,158
MAGNETIC TORQUE TRANSMITTING DEVICES
Filed Dec. 27, 1954   3 Sheets-Sheet 1
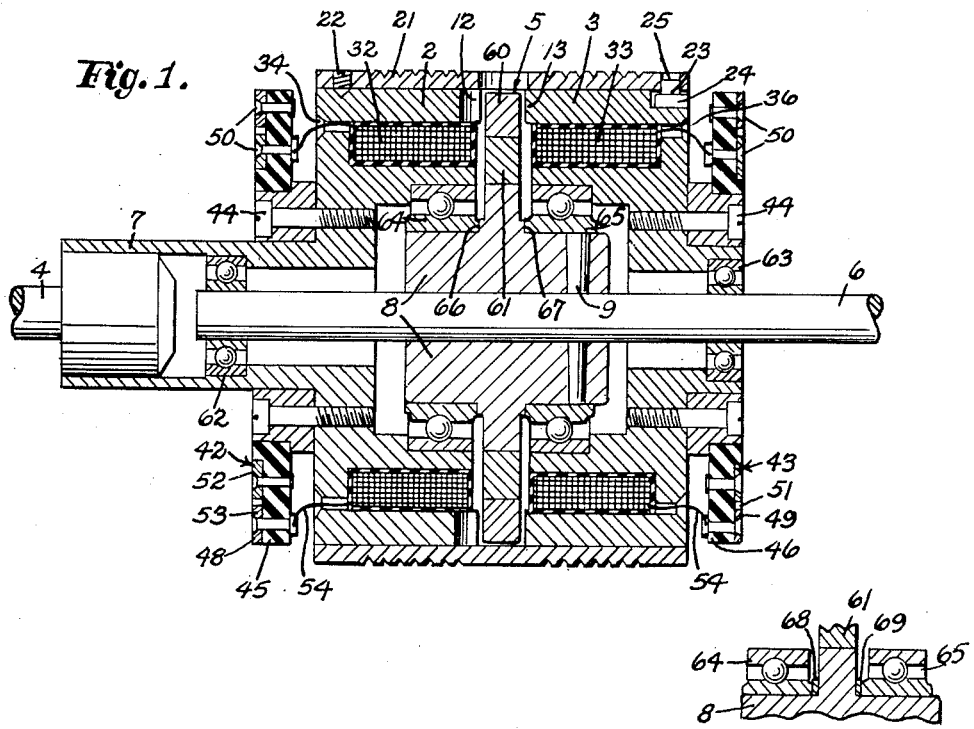
Fig. 1.
Fig. 1a.
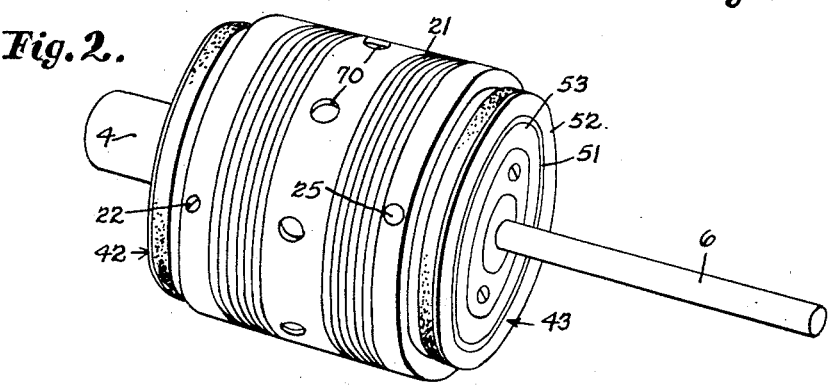
Fig. 2.
INVENTORS
JOHN L. EMERY
ROBERT T. W. LIANG
BY
ATTORNEY

INVENTORS
JOHN L. EMERY
ROBERT T. W. LIANG
BY
ATTORNEY

Sept. 10, 1957 J. L. EMERY ET AL 2,806,158
MAGNETIC TORQUE TRANSMITTING DEVICES
Filed Dec. 27, 1954. 3 Sheets-Sheet 3

INVENTORS
JOHN L. EMERY
ROBERT T. W. LIANG
BY Benjamin J. Barish
ATTORNEY

# United States Patent Office 2,806,158
Patented Sept. 10, 1957

2,806,158

MAGNETIC TORQUE TRANSMITTING DEVICES

John L. Emery, Oak Park, and Robert T. W. Liang, Detroit, Mich., assignors to Burroughs Corporation, Detroit, Mich., a corporation of Michigan Application December 27, 1954, Serial No. 477,812

8 Claims. (Cl. 310—103)

This invention relates to magnetic torque transmitting devices, and is described herein with particular reference to a type of magnetic clutch which utilizes the hysteresis property of a magnetic material for torque transmission, although it will be understood that it is applicable to other types of magnetic torque transmitting devices.

Magnetic clutches operating in accordance with the foregoing principle include a primary magnetic field producing member and a secondary magnetic member of high hysteresis loss material in which is induced a series of magnetic poles. As the primary member rotates, work is required to magnetize and demagnetize the series of magnetic poles induced in the secondary member, because of hysteresis losses. The larger the hysteresis losses the larger the torque output.

A known construction of this type of magnetic clutch utilizes a driving electromagnetic member provided with opposing, staggered poles defining an air gap, and a driven magnetic member of high hysteresis loss material interposed in the air gap between the poles. Successive portions of the driven member become polarized in opposite senses by the staggered poles of the electromagnet, and as the electromagnet is caused to rotate, torque is transmitted to the driven member as a result of driving the polarized portions through their hysteresis cycles. This principle of transmitting torque, as distinguished from other magnetic torque transmitting devices, is described on pages 159 and 160 of "Machine Design," April 1949; and a magnetic clutch construction operating in accordance with this principle is disclosed in U. S. Patent No. 2,571,762, granted October 16, 1951.

The advantages of magnetic clutches have made them more suitable for many applications than mechanical clutches. As the coupling between the driving and driven members is effected by means of a magnetic field, friction and wear of parts is substantially reduced and also the opening shock upon application of full load is cushioned. Furthermore, magnetic clutches of the hysteresis type have torque transmission characteristics substantially independent of the differential speed, or slip, between the coupled members, since the magnitude of the output torque is dependent on the hysteresis losses, which are not a function of speed. These advantages, together with the convenience of control that can be exercised to regulate the torque output, make clutches of this type especially adaptable for various business machine applications, as for example in coupling a carriage shifting mechanism of a shiftable-carriage type of business machine to its motor drive.

For many applications of magnetic clutches, and especially for business machine applications, the size of the clutch, which must be kept small, and the permissible temperature rise of the clutch, are distinct limitations as to the magnitude of torque that can be transmitted. The dimensions of the air gap in the magnetic circuit which couples the clutch members are critical for an efficient design, and frequently, because of inability to maintain close manufacturing tolerances or because of wear or distortion of parts during use, it may be necessary to alter or adjust the dimensions of the air gap.

An object of this invention is to provide a magnetic torque transmitting device of relatively small size, constructed of relatively few parts which are inexpensive to make and which can be easily and quickly assembled.

A further object of this invention is to provide a magnetic torque transmitting device which, by its inherent design, makes practical air gaps of relatively small size, in the order of .005 to .010 inch, and permits alteration or adjustment of the air gaps easily and conveniently after the parts have been manufactured.

Another object of this invention is to provide a simplified and efficient magnetic torque transmitting device having torque transmission characteristics substantially independent of the relative speed of the coupled members.

The foregoing objects, as well as additional objects and advantages which will become apparent as the description proceeds, are obtainable by the novel magnetic torque transmitting device described herein constructed in accordance with this invention. The device comprises a magnetic-field producing body to be fixed to, e. g., the drive shaft, and another body magnetically coupled thereto to be fixed to, e. g., the driven shaft. According to the invention the first clutch body is divided into two sections, one of which may be directly fixed to its shaft and the other of which is mechanically coupled to the first section, to rotate therewith, by a removable sleeve. The two sections are each provided with a plurality of teeth to form flux concentration areas, or poles, and are coupled together by the sleeve with their poles in opposed relationship to define a magnetic air gap in which the magnetically coupled body is interposed.

Where the invention is embodied in a hysteresis type of magnetic clutch, as described herein, the two sections of the magnetic field producing body are mechanically coupled by the removable sleeve with their poles in a staggered relationship, that is a pole of one section faces a valley of the other, and the magnetically coupled body is made of a magnetically permeable, high hysteresis loss material.

According to one embodiment of the invention, the coupling sleeve overlies both sections of the magnetic field producing body and is provided with means permitting some axial movement of one section towards the other when magnetically attracted thereto. This construction conveniently permits the quick assembly and disassembly of the device and the insertion of thin spacer washers, if desired, between those abutting surfaces that determine the dimensions of the magnetic air gap, should a need arise to alter these dimensions.

According to a second embodiment of the invention, the coupling sleeve partially overlies the two sections and is seated in a recess formed in each of the two sections. In this embodiment, the dimensions of the air gap are determined by the sleeve abutting against the surfaces of the recessed portions of the two sections. This construction is advantageous for higher torque rating clutches in that it relieves the bearings from the axial thrust loads, these loads being absorbed by the sleeve, and still permits the dimensions of the air gap to be varied by the substitution of a slightly longer, or shorter, sleeve, or by the use of thin spacer washers.

In the drawings, illustrating the two embodiments;

Fig. 1 is a longitudinal sectional view of one embodiment of hysteresis type of magnetic clutch constructed in accordance with the invention;

Fig. 1a is a fragmentary sectional view of a modification of Fig. 1, illustrating one of the advantages of the invention.

Fig. 2 is a perspective view of the clutch of Fig. 1 assembled as it would normally be used.

Figure 3:
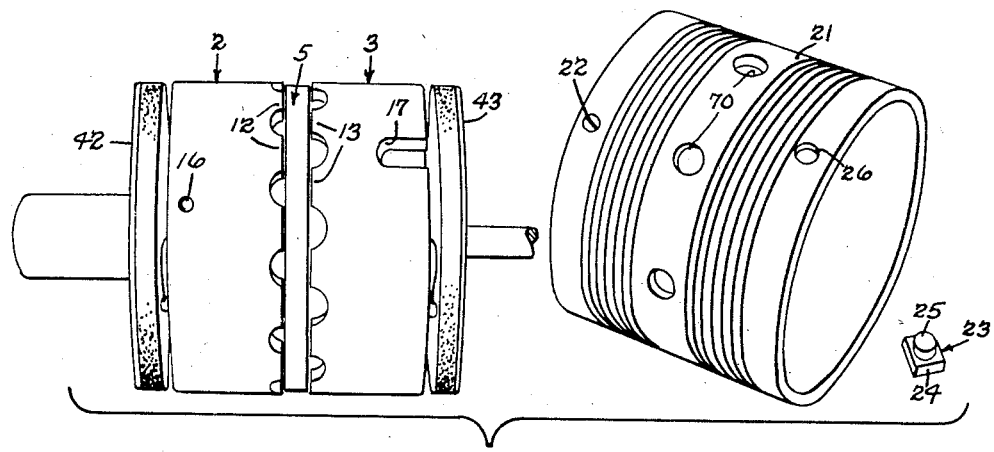
Fig. 3 illustrates the clutch of Fig. 1 with the coupling sleeve removed to show the staggered pole relation of the two sections which is maintained when assembled with the coupling sleeve.

Referring to Figs. 1–4 of the drawings, the novel magnetic clutch comprises a magnetic field producing body divided into two similar sections, 2 and 3, which transmit the torque from the drive shaft 4 to the magnetically coupled clutch body, generally designated as 5, to the output, or driven, shaft 6. Hub 7 of section 2 may be splined or otherwise fixed to drive shaft 4, and hub 8 of clutch body 5 may be fixed to driven shaft 6 by pin 9 or other suitable securing means.

Figure 4:
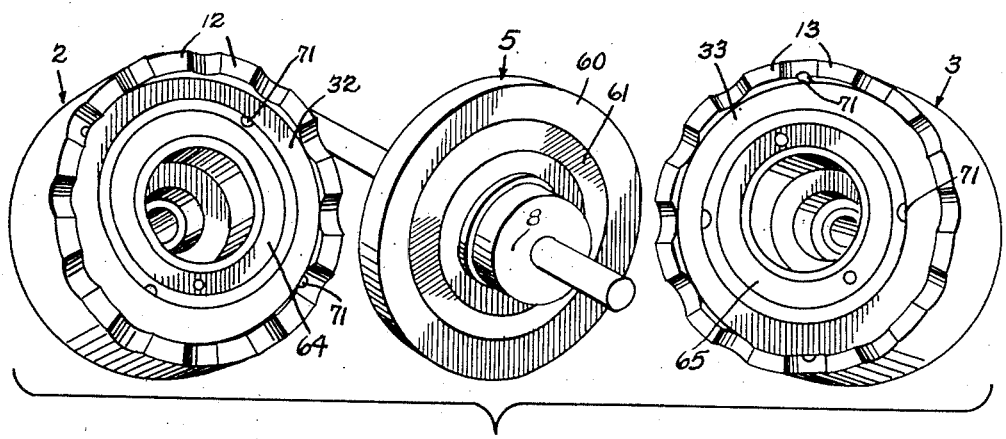
Fig. 4 illustrates the clutch of Fig. 1 where the main parts are disassembled.

As clearly shown in Figs. 3 and 4, each of sections 2 and 3, which are made of material having a high magnetic permeability, is provided with a plurality of equally spaced peripheral teeth, or poles, 12 and 13, forming flux concentration areas for the magnetic circuit. Each section is also provided with a cylindrical recess to accommodate energizing coils 32 and 33. In addition, an opening 16 is formed in the cylindrical surface of section 2 and an elongated slot 17 is formed in the surface of section 3 to facilitate coupling the two sections together as hereinafter described.

Means are provided for mechanically coupling the two sections in the staggered pole relationship shown in Fig. 3 whereby poles 12 of section 2 all face valleys of section 3, and vice versa. This means include coupling sleeve 21 overlying the two sections and secured at one end to section 2 by a screw 22 engaging opening 16, and coupled at its other end to section 3 by stud 23 having an enlarged head 24 engaging slot 17 and a reduced shank 25 inserted in an opening in sleeve 21. In the illustrated construction, sleeve 21 is made of non-magnetic material, such as aluminum. Slot 17 acommodates the head of stud 23 with some play for reasons which will become apparent as the description proceeds. To decouple the two sections by removing sleeve 21, all that is necessary is to remove screw 22 which will then permit the sleeve to be slid axially in the direction of stud 23, the latter dropping out as it clears slot 17.

The magnetic field is preferably produced by two energizing coils which, in this embodiment, permit separate or joint control. Section 2 of the magnetic field producing body is provided with an energizing coil 32 having lead-in openings 34. Section 3 may be similarly provided with an energizing coil 33 having lead-in openings 36. Slip ring assemblies 42 and 43 are secured to each of the two sections by bolts 44, or other securing means. Each of the slip ring assemblies includes an insulating disc 45, 46 having an electrically conductive segment 48, 49 secured thereto by rivets 50. A circular ring of the conductive material is removed from each segment as shown at 51, Fig. 2, to provide two conductive rings 52, 53 insulated from each other for each slip ring assembly. Leads or jumper wires, 54 connect the coils to the conductive slip rings, and the latter may be energized by brushes (not shown).

Each of the energizing coils is made of a plurality of turns of insulated conductors wound on a bobbin of molded nylon, phenolic resin, or other suitable insulating material. The coil may be impregnated, or encapsulated, with dielectric material as is well known in the art. In the disclosed embodiment the coils are retained within the sections of magnetic permeable material by a press fit, but it may be found desirable to utilize additional securing means, such as retainer rings.

Field producing sections 2 and 3 are made of high permeability material such as low carbon steel.

It will be seen thus far in the description that the two sections of the magnetic field producing body, mechanically coupled by sleeve 21, will be rotated together by the drive shaft and will produce a rotating magnetic field across an air gap defined by their poles 12, 13. Interposed in this air gap is ring 60 of driven clutch body 5 which is magnetically coupled to the rotating clutch body and transmits the torque to the output shaft.

Driven clutch body 5 includes the hub 8 fixed to the driven shaft, the ring 60, and an intermediate ring 61. Hub 8 is made of high permeable magnetic material, preferably of the same material as sections 2 and 3 of the first clutch body, as it is in the magnetic circuit produced by them. Intermediate ring 61 is made of a non-magnetic material, such as brass, to restrict the flux in the air gap to the path between poles 12 and 13 in which ring 60 is disposed thereby producing a maximum flux density therein.

Ring 60, in a hysteresis type of magnetic clutch, would be made of magnetically permeable, high hysteresis loss material and preferably of a material requiring a relatively low field intensity to produce this loss. The aluminum-nickel-cobalt alloys are very suitable in many applications of this type of magnetic clutches. However, for small size clutches the field intensity required would create heat dissipation problems, and it is therefore preferable in the disclosed clutch to use a cobalt-steel alloy, for example a 36% cobalt-steel, although it will be understood that any high hysteresis loss material could be used.

It will be apparent from the foregoing description that the magnetic flux produced by the energizing coils pass from one of the flux permeable sections of the first clutch body, through hub 8 of driven clutch body 5, through the other flux permeable section and across the air gap in which magnetic ring 60 of driven clutch body 5 is interposed. All the poles 12 of section 2 are of the same sense, e. g. north poles, and all the poles 13 of section 3 are of the opposite sense, e. g. south poles. As the two sets of poles are staggered with respect to each other, successive portions of the ring 60 become polarized in cyclically varying flux densities, and in order that ring 60 will be permitted to move with respect to poles 12, 13, work is required to drive the polarized portions of ring 60 through their hysteresis cycles. The larger the hysteresis losses in ring 60, the more work that is required, and the greater the torque transmitted.

The torque output is theoretically independent of the relative speed between the clutch body, being dependent only on the hysteresis loss of the material used for ring 60, the volume of material, and the number of poles. Actually, however, the torque output is slightly affected at high slip because of some eddy current coupling. The number of poles can be determined by routine design, twelve poles for each of the two sections being shown in the illustrated embodiment.

The theoretical torque output can be computed by the equation:

$$T = .704 \; VHP$$

where:

$T$ = torque in lb.-inch.
$V$ = volume of magnetic ring 60 in meters$^3$
$H$ = hysteresis loss, Joules/met.$^3$/cycle
$P$ = number of poles The clutch body producing the magnetic field includes ball bearings 62, 63 between it and the driven shaft 6, and ball bearings 64, 65 between it and the hub 8 of driven clutch body 5, as shown in Fig. 1. These bearings may be press-fitted in sections 2 and 3 of the driving clutch body, as shown. Bearings 64, 65 are of larger size than bearings 62, 63 and must be capable of resisting axial thrust loads as well as radial loads.

It will be understood that the useful magnetic field transmitting the torque is the air gaps between poles 12 and magnetic ring 60 and between poles 13 and magnetic ring 60. In a clutch constructed in accordance with the invention, air gaps in the order of .005 to .010 inch are practical. Hitherto it was frequently difficult to maintain sufficiently close manufacturing tolerances between the coupled members, being movable with respect to each other, to provide an air gap of this order. Moreover, wear or distortion of parts during use may alter the air gap so that the parts must be machined or replaced to correct the condition. An important feature of this embodiment of the invention is that by the inherent construction of the clutch, the air gap may be adjusted or varied quickly and easily and without requiring further machining of parts.

Referring again to Fig. 1, it will be seen that the air gap between poles 12 and ring 60 is determined by the position of the driven clutch body 5 when its hub 8 abuts bearing 64. Hub 8 may be provided with a slightly enlarged flat shoulder 66 for this purpose. Similarly, the air gap between poles 13 and ring 60 is determined by the opposite end of hub 8 abutting against bearing 65, and a shoulder 67 may also be provided on the hub for this purpose. When the magnetic circuit is energized by the coils, section 3 of the first clutch body will be attracted axially until hub 8 abuts against bearings 64 and 65. Axial movement of section 3 is permitted by the elongated slot 17. After the parts have been manufactured, thin spacer rings or washers can be inserted between these bearings and hub 8, if it is found necessary to vary the air gaps. Also during use, if a corrective need arises, the parts can be quickly disassembled by removing screw 22 as described above, and spacer washers inserted or removed. Fig. 1a illustrates the use of the spacer washers shown as 68 and 69, and Figs. 3 and 4 illustrate how the main parts of the clutch can be quickly disassembled for insertion or removal of the washers and then quickly reassembled.

The use of two energizing coils 32 and 33, one for each of sections 2 and 3, distributes the flux more efficiently and, in the disclosed embodiment, permits the magnetic field to be conveniently controlled to transmit either a partial torque or a full-load torque. By energizing one coil a partial torque may be transmitted and by energizing both, the full-load torque may be transmitted. Selective, or joint energization of the coils may be conveniently accomplished by switches controlling the voltages applied to the brushes (not shown).

For heat dissipation purposes, there may be provided a series of openings 70 on sleeve 21, and openings 71 in sections 2 and 3. Openings 70 may also be used as sight ports for observing driven member 5, and for measuring the air gaps.

It is thus seen that the magnetic clutch of Figs. 1 to 4 is constructed of relatively few parts which can be easily and quickly assembled and disassembled, and that by its inherent design, it conveniently permits alteration of the magnetic air gaps which couple the clutch bodies. In this embodiment, however, the torque transmission capability of the clutch is limited by the thrust loads that bearings 64 and 65 can resist without tending to "lock," as these bearings will be subjected to axial forces in limiting the movement of section 3 when magnetically attracted towards section 2.

Figure 5:
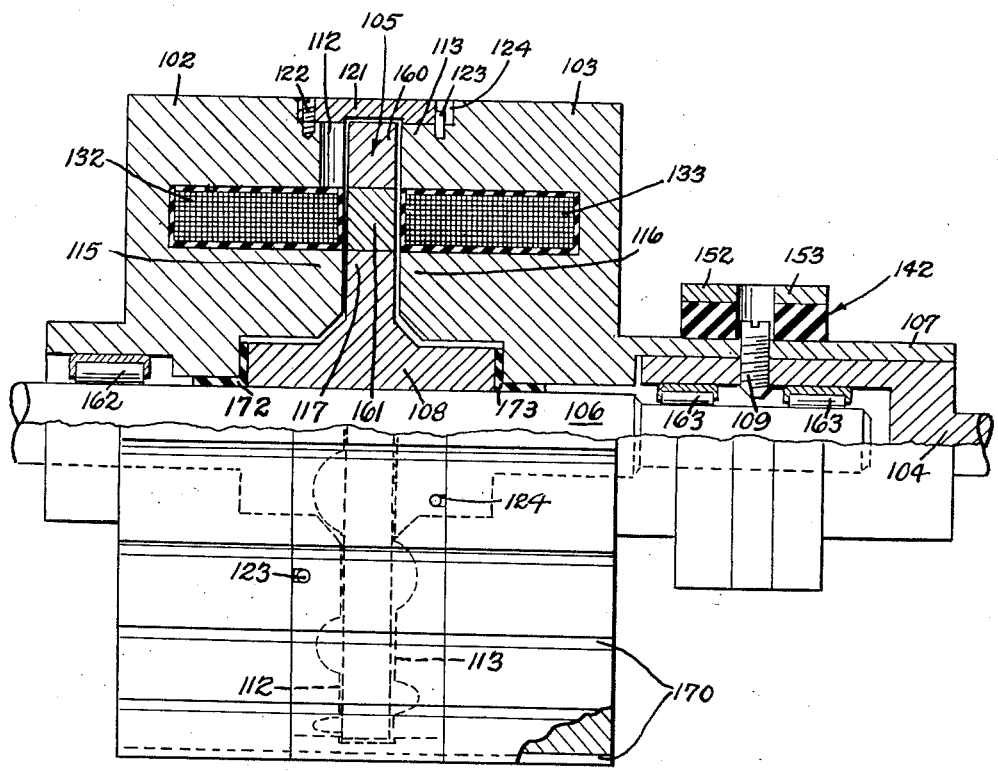
Fig. 5 is a side elevation, partly in section, of another embodiment of hysteresis type of magnetic clutch constructed in accordance with the invention.

Fig. 5 discloses another embodiment of hysteresis type of magnetic clutch constructed in accordance with the invention which is especially useful in applications requiring larger torque transmitting characteristics than those obtainable by the clutch of Figs. 1-4. The embodiment of Fig. 5 comprises the magnetic field producing clutch body divided into two sections 102 and 103 of magnetically permeable material, a removable coupling sleeve 121, and the driven clutch body 105. In this embodiment, the coupling sleeve 121 does not completely overlie both sections 102 and 103, but rather is seated in a recess formed in each section. By this construction, the thrust loads are absorbed mainly by the sleeve 121 abutting against the recessed portions of sections 102 and 103. The sleeve thus also determines the dimensions of the air gaps between the hysteresis ring 160 of driven clutch body 105 and the opposed staggered poles 112 and 113 of sections 102 and 103. The surface of sleeve 121 adjacent to ring 160 may be slightly recessed, as shown, to provide a clearance for the ring.

Sections 102 and 103 may be provided with small radial pins 123 which engage slots 124 formed on sleeve 121. It will be appreciated that this pin and slot arrangement does not permit axial movement of one of the two sections with respect to the other, since the non-slotted portions of sleeve 121 abut against the recessed portions of the two sections and restrain the movement of the section. Set screw 122 passing through sleeve 121 and engaging a blind opening in section 102 secures the assembly together. This arrangement couples sections 102 and 103 to rotate therewith and also insures that when the two sections are thus coupled their poles will be in staggered relationship. To dismantle the clutch all that is necessary is to remove screw 122 whereby the main parts of the clutch may be conveniently disassembled.

In the embodiment of Fig. 5, driven clutch body 105 also includes a non-magnetic ring 161 and a flux permeable hub 108 which may be splined or otherwise secured to driven shaft 106.

Sections 102 and 103 of Fig. 5 are similar to sections 2 and 3 of Figs. 1 to 4 but have been slightly modified to increase the permeance of the magnetic circuit. Thus the two sections terminate, as close as manufacturing tolerances will permit, to all contiguous surfaces of hub 108. Also, portions 115 and 116 of the two sections between energizing coils 132 and 133 and hub 108 are aligned with upper portions 117 of hub 108 to increase the permeance from one section, through the hub, and to the other section. The coils are thus aligned with non-magnetic ring 161. These modifications can, of course, be incorporated in the embodiment of Figs. 1–4.

The axial thrust loads that affect parts of the clutch are derived from a number of forces. First, the magnetic field between sections 102 and 103 produces an axial force tending to attract one section towards the other. This force is resisted, in the embodiment of Fig. 5, primarily by sleeve 121. However, there will be some magnetic attraction of clutch body 105 towards section 102 or 103 resulting from the magnetic field passing through permeable portions 108 and 160. Although the forces between clutch body 105 and the two sections will be opposite and approximately equal, they will never be exactly equal to balance each other, producing a relatively small axial resultant force. Also, there will be some axial thrust from the mechanical load driven by shaft 106.

To resist the latter two axial forces, which normally are of much less magnitude than the magnetic attraction between sections 102 and 103, a pair of molded nylon plastic rings or bearings 172 and 173 may be inserted between adjacent surfaces of hub 108 and sections 102 and 103. These nylon bearings also serve to maintain clutch body 105 with its ring 160 spaced exactly midway between poles 112 and 113.

Section 103 may be secured to its shaft 104 by means of a screw 109 fastened through its extended hub 107. Roller bearings 163 are interposed on each side of screw 109 between the extended rim of driving shaft 104 and driven shaft 106. Another roller bearing 162 separates section 102 from driven shaft 106.

The clutch of Fig. 5 illustrates an alternative slip ring arrangement that could be used for energizing coils 132 and 133 where sufficient to exercise only joint control over both coils. In this construction, slip ring assembly 142 is mounted on hub 107 by the same pin 109 which secures the magnetic field producing body to its shaft 104. To control both coils 132 and 133 jointly from a single power supply, only two slip rings 152 and 153 are necessary. The slip rings may be connected to the two coils, preferably in a parallel connection, by any suitable means and are energized from a source of power by brushes, not shown.

Since sleeve 121 does not completely overlie sections 102 and 103, the exposed outer surfaces of the two sections dissipate more of the heat generated by the clutch. To increase heat dissipation, outer surfaces of sections 102 and 103 and sleeve 121 may be provided with longitudinally extending recesses 170 or corrugations, which tend to increase the turbulence of the air as the clutch rotates. Suitable ventilating apertures, as shown in Figs. 1–4, may also be provided if desired.

It will be appreciated that the embodiment of Fig. 5 is not limited in its torque rating by the thrust loads, resulting from the magnetic attraction between sections 102 and 103, that can be resisted by bearings such as 64 and 65 of Figs. 1–4, since these loads are taken up primarily by sleeve 121. This embodiment therefore is useful in applications requiring higher torque ratings than those that can be obtained by the clutch of Figs. 1 to 4. Since the air gaps in the embodiment of Fig. 5 are determined by the dimensions of sleeve 121, it is seen that the air gaps can be varied by substituting a slightly longer or shorter sleeve, or by inserting thin spacer washers between the sleeve and the abutting surfaces of sections 102 and 103 in a manner similar to that disclosed in Figs. 1 to 4. If the air gaps are thus varied, appropriate changes in nylon bearings 172 and 173, by using slightly thicker or thinner bearings or by use of spacer washers would also have to be made to maintain ring 169 exactly midway between poles 112 and 113.

The various elements of the clutch of Fig. 5 may be made of the same material as the comparable elements of the clutch of Figs. 1 to 4.

The invention has been described in connection with two embodiments of magnetic clutches of the hysteresis type, these being preferred embodiments. However, it will be apparent that the principles of the invention could be generally incorporated in other types of magnetic clutches, such as the eddy current or reluctance types. Also, while the invention has been described in connection with clutches for coupling a load to its drive, it will be equally apparent that the invention is also applicable to torque transmitting devices in general, whether used to drive or to brake a load. Other modifications and variations will be apparent to those skilled in the art which come within the spirit and purview of the invention as defined in the following claims.

We claim:

1. A magnetic torque transmitting device of the hysteresis type for transmitting a torque from a driving shaft to a driven shaft comprising; a magnetic field producing body divided into two sections of magnetically permeable material each having a plurality of poles on one surface thereof, one of said sections being fixed to said driving shaft; a removable non-magnetic sleeve coupling the other section with said one section to rotate therewith with their poles facing each other in staggered relationship and defining a magnetic air gap between said staggered poles, said coupling sleeve including means permitting some axial movement of the other section towards the one section when magnetically attracted thereto; and a second body between the two sections comprising a ring of magnetically permeable, high hysteresis loss material interposed in said air gap between said poles, a hub of magnetically permeable material in the magnetic circuit of the two sections and limiting the axial movement of said other section to space said ring relative to said poles, and an intermediate non-magnetic ring to restrict the flux in the air gap to the path between the staggered poles thereby producing a maximum flux density therein, said hub being fixed to said driven shaft.

2. A magnetic clutch of the hysteresis type for coupling a driving shaft to a driven shaft comprising; a magnetic field producing clutch body divided into two similar sections of magnetically permeable material each section having an energizing coil, a plurality of poles on one surface thereof, and a bearing, one of said sections being adapted to be fixed to the driving shaft to be driven thereby; a removable, non-magnetic sleeve overlying both said sections and coupling same to rotate together on said bearings with the poles of the two sections facing each other in staggered relationship and defining an air gap, said sleeve including means permitting some axial movement of the other of said sections towards said one section when magnetically attracted thereto, and a second clutch body between the two sections of the first clutch body and magnetically coupled thereto comprising a hub of magnetically permeable material adapted to be fixed to said other shaft and disposed between said two sections limiting the axial movement of said other section by engaging the bearings of the two sections, a ring of magnetically permeable, high-hysteresis loss material supported by said hub in said air gap between said staggered poles, and a further ring of non-magnetic material interposed between said hub and said first-mentioned ring.

3. A magnetic clutch as defined in claim 1 wherein said other section is formed with an elongated slot on a surface thereof, and wherein said means permitting some axial movement of the other section includes a stud engaging an opening on said coupling sleeve and the elongated slot on said other section.

4. A magnetic clutch of the hysteresis type for coupling a driving shaft to a driven shaft comprising; a magnetic field producing clutch body divided into two similar sections of magnetically permeable material each section having an energizing coil, a recess and a plurality of poles formed on one surface thereof, one of said sections being adapted to be fixed to the driving shaft to be driven thereby; a removable, non-magnetic sleeve coupling the other section with said one section with their poles facing each other in staggered relationship and defining a magnetic air gap between said staggered poles, said coupling sleeve being seated in said recesses and restraining the axial movement of the other section towards the one section when magnetically attracted thereto; and a second clutch body between the two sections of the first clutch body and magnetically coupled thereto comprising a hub of magnetically permeable material adapted to be fixed to said other shaft and disposed between said two sections in the magnetic circuit thereof, a ring of magnetically permeable, high hysteresis loss material supported by said hub in said air gap between said staggered poles, and a further ring of non-magnetic material interposed between said hub and said first mentioned ring to restrict the flux in the air gap to the path between the staggered poles thereby producing a maximum flux density therein.

5. A magnetic clutch as defined in claim 4 wherein said coils are disposed in substantial alignment with said non-magnetic ring of said second clutch body, and wherein plastic bearings are interposed between said hub and an adjacent surface of each of the two sections to maintain said hysteresis ring exactly midway between said poles.

6. A magnetic clutch as defined in claim 4 wherein the recessed portions of the two sections are provided with radial pins and said sleeve is formed with peripheral slots engaging said pins when the clutch is assembled, to insure that the staggered relationship of the poles will be maintained during operation.

7. A magnetic clutch of the hysteresis type for coupling a driving shaft to a driven shaft comprising; a magnetic field producing clutch body divided into two similar sections of magnetically permeable material each section having an energizing coil, and a plurality of poles on one surface thereof, one of said sections being fixed to the driving shaft; a removable, non-magnetic sleeve at least partially overlying both of said sections and coupling same to rotate together with the poles of said sections facing each other in staggered relationship and defining a magnetic air gap between said staggered poles; and a second clutch body between the two sections of the first clutch body and magnetically coupled thereto comprising a hub of magnetically permeable material fixed to said driven shaft and disposed between said two sections in the magnetic circuit thereof, a ring of magnetically permeable, high hysteresis loss material supported by said hub in said air gap between said staggered poles, and a further ring of non-magnetic material supported by said hub between same and said first-mentioned ring to restrict the flux in the air gap to the path between the staggered poles thereby producing a maximum flux density therein.

8. A magnetic torque transmitting device of the hysteresis type for transmitting a torque from a driving shaft to a driven shaft comprising; a magnetic field producing body divided into two sections of magnetically permeable material each having a plurality of poles on one surface thereof, one of said sections being fixed to one of the shafts; means coupling the other section with said one section to rotate therewith with their poles facing each other in staggered relationship and defining a magnetic air gap between said staggered poles; and a second body between the two sections comprising a ring of magnetically permeable, high hysteresis loss material interposed in said air gap between said poles, a hub of magnetically permeable material fixed to the other shaft and disposed between said two sections in the magnetic circuit thereof, and a further ring of non-magnetic material supported by said hub between same and said first-mentioned ring to restrict the flux in the air gap to the path between the staggered poles thereby producing a maximum flux density therein.

References Cited in the file of this patent

UNITED STATES PATENTS

| | | |
|---|---|---|
| 2,361,239 | Ransom | Oct. 24, 1944 |
| 2,519,882 | Bullard | Aug. 22, 1950 |
| 2,640,166 | Zozulin | May 26, 1953 |
| 2,680,203 | Zozulin | June 1, 1954 |

FOREIGN PATENTS

| | | |
|---|---|---|
| 629,919 | Great Britain | Sept. 30, 1949 |